US012662432B2

(12) United States Patent
Teerlink

(10) Patent No.: US 12,662,432 B2
(45) Date of Patent: Jun. 23, 2026

(54) ANTI-FUNGAL PELLETED BLEND FOR TREATING PLANT FUNGAL DISEASE

(71) Applicant: Steven R. Teerlink, Sandy, UT (US)

(72) Inventor: Steven R. Teerlink, Sandy, UT (US)

(*) Notice: Subject to any disclaimer, the term of this patent is extended or adjusted under 35 U.S.C. 154(b) by 915 days.

(21) Appl. No.: 17/865,801

(22) Filed: Jul. 15, 2022

(65) Prior Publication Data

US 2023/0031019 A1 Feb. 2, 2023

Related U.S. Application Data

(60) Provisional application No. 63/222,043, filed on Jul. 15, 2021.

(51) Int. Cl.
| | |
|---|---|
| *C05B 7/00* | (2006.01) |
| *C05D 9/02* | (2006.01) |
| *C05G 5/30* | (2020.01) |

(52) U.S. Cl.
CPC ................. *C05B 7/00* (2013.01); *C05D 9/02* (2013.01); *C05G 5/30* (2020.02)

(58) Field of Classification Search
CPC ............... C05B 7/00; C05D 9/02; C05G 5/30
See application file for complete search history.

(56) References Cited

U.S. PATENT DOCUMENTS

| | | | | |
|---|---|---|---|---|
| 3,580,715 A | 5/1971 | Dilday | | |
| 5,432,148 A | 7/1995 | Winston | | |
| 6,458,747 B1 | 10/2002 | Kulik | | |
| 11,542,213 B2 * | 1/2023 | Siegel | ...................... | C05G 5/12 |
| 12,565,458 B2 * | 3/2026 | Balige | ...................... | C05B 1/02 |
| 2008/0269053 A1 | 10/2008 | Less et al. | | |
| 2009/0099021 A1 | 4/2009 | Dean | | |
| 2013/0011489 A1 | 1/2013 | Teerlink | | |
| 2014/0069005 A1 | 3/2014 | Teerlink | | |
| 2015/0118326 A1 | 4/2015 | Teerlink | | |
| 2018/0125076 A1 | 5/2018 | Teerlink | | |
| 2018/0222810 A1 * | 8/2018 | Schumski | ............... | C05C 9/005 |
| 2020/0236947 A1 | 7/2020 | Teerlink | | |

FOREIGN PATENT DOCUMENTS

| | | | | |
|---|---|---|---|---|
| EP | 2542514 B1 * | 9/2020 | ............... | B05D 7/24 |
| GB | 2586121 A * | 2/2021 | ............... | C05G 5/30 |

OTHER PUBLICATIONS

Bauer, et al., Necrotic Ring Spot on Turf in Oregon, Oregon State University Extension Service, EC 1462, Oct. 1995, 4 pages.
Chang, et al., Generation of volatile ammonia from urea fungicidal to Phellinus noxius in infested wood in soil under controlled conditions, Plant Pathology, 1999, Vo. 48, pp. 337-344.
Fertilizer Conversions, NC State University, College of AG & Life Science, 1 page.
Pennisi, et al., Conversion Tables, Formulas and Suggested Guidelines for Horticultural Use, Cooperative Extension Service/The University of Georgia College of Agricultural and Environmental Sciences, Bulletin 931, 2002, 40 pages.
Tisserat, Necrotic Ringspot of Kentucky Bluegrass, Colorado State University Extension, Fact Sheet No. 2,900, Gardening Series/Diseases, 2006, 3 pages.
Carlos, et al., Necrotic Ring Spot of Lawn, University of Nevada Cooperative Extension (UNCE), Mar. 21, 2006, 4 pages.
Carlos, et al., Controlling Necrotic Ring Spot Cool Season Grasses, University of Nevada Cooperative Extension, Bringing the University to You, Fact Sheet 05-52, 2005, 4 pages.
Evans, et al., Necrotic Ring Spot, Utah Pests Fact Sheet, Utah State University Extension and Utah Plant Pest Diagnostic Laboratory, PLP-003-PR, Mar. 2008, 3 pages.
Necrotic Ring Spot and Net Blotch, http://www.stma.org/sites/stma/files/Technical_Resources_Diseases/Necrotic_Ring_Spot_-Net_Blotch.pdf, accessed Jul. 17, 2015, 2 pages, Sports Turf Managers Association, Kansas.
Proud Green Home, Try watering your lawn at night for healthier grass, https://www.proudgreenhome.com/news/try-watering-your-lawn-at-night-for-healtheir-grass/, accessed Dec. 1, 2021, 2 pages.
Current Results weather and science facts, Salt Lake City UT Average Temperatures by Month, TheWayback Machine, https://web.archive.org/web/20161018011747/http://www.currentresults.com/Weather/Ut . . . , accessed Dec. 1, 2021, 5 pages.
Current Results research news & science facts, Monthly Humidity Averages for Utah, The Wayback Machine, https://web.archive.org/web/20120511023831/http:www.currentresults.com/Weather/Utah/h . . . , accessed Dec. 1, 2021, 2 pages.
Lawn Doctor, A Quick Guide for Summer Irrigation—How Often Should You Water Your Lawn in the Summer?, https:/www.lawndoctor.com/blog/summer-lawn-irrigation/, accessed Dec. 1, 2021, Jul. 5, 2016, 5 pages.
Green & Pristine, Consumer Products Catalog, Gro Fine, 2009/2010 Season; www.knoxfert.com, 4 pages.

* cited by examiner

*Primary Examiner* — Wayne A Langel
(74) *Attorney, Agent, or Firm* — Thorpe North & Western, LLP

(57) ABSTRACT

The present disclosure is drawn to anti-fungal pelleted blends, such as blends including multiple types of dry pellets homogenously admixed together. Pellets of the blend may include urea source pellets; ammonium source pellets including ammonium sulfate; phosphorus source pellets including an ammonium phosphate compound; and potassium source pellets including potassium chloride, potassium phosphate, potassium nitrate, potassium sulfate, or a combination thereof. The anti-fungal pelleted blend can be from 90 wt % to 100 wt % dissolvable in water at 20° C. within about 3 minutes. The multiple types of dry pellets may provide a total nitrogen content from 15 wt % to about 40 wt %, a total phosphorus content from about 1.8 wt % to about 8.8 wt %, and a total potassium content from about 4.1 wt % to about 16.6 wt %.

33 Claims, No Drawings

1

ANTI-FUNGAL PELLETED BLEND FOR TREATING PLANT FUNGAL DISEASE

The present application claims the benefit of U.S. Provisional Patent Application No. 63/222,043, filed on Jul. 15, 2021, which is incorporated herein by reference.

BACKGROUND

In the field of agriculture and horticulture, control of plant pests such as harmful insects; fungi, and microorganisms, such as bacteria and viruses can be a struggle. Such controls can include sprays carrying traditional synthetic chemical pesticides; including chemical fungicides. Some sprays can be used without chemical pesticides, in which case a component(s) of the spray can be used for interference with physical interactions of fungi or fungi spores at the host plant, e.g., leaves, roots, etc. One specific use for application of pesticides and/or fungicides relates to controlling turfgrass infections. Turfgrass generally includes any maintained grass surface, such as are typically used for lawns at homes, businesses, parks, golf courses, etc. Turfgrass has often been treated with pesticides or fungicides to control pests, resulting in high maintenance costs and harmful effects to humans and the environment.

DETAILED DESCRIPTION

The present disclosure relates to compositions and methods for treating plants for fungal infections and disease, Rather than using synthetic chemical compounds often associated with pest control, a pelleted blend of nutrients can be applied to enhance the health of the plant and soil being treated, resulting in a healthy plant with a diminished or dormant fungal infection, or no fungal infection, remaining in some instances. In accordance with this, anti-fungal pelleted blends for application in conjunction with specific application and watering instructions can result in effective treatment of fungal infections, e.g., necrotic ring spot infection on turfgrass or other fungal infections on other types of plants. As used herein, "turfgrass" includes any type or variety of graminoid or graminoid-like plant. To avoid confusion, some types of turfgrass are sometimes conventionally referred to as "grass" or "lawn." Furthermore, while the present disclosure relates generally to treating plants and soil, e.g., turfgrass, suffering from various fungal diseases, such as *Fusarium, Pythium, Phytophthora, Verticillium, Rhizoctonia, Macrophomina, Thielaviopsis, Ophiosphaerelia*, and *Scierotinas*, in one aspect, the fungal disease can be Necrotic Ring Spot, *Ophiosphaerella korrae*, which is a soil-borne fungi that mainly infects turfgrass roots.

In accordance with this, the present disclosure includes anti-fungal pelleted blends that include multiple types of dry pellets homogenously admixed together. The dry pellets, for example, can include a blend of urea source pellets, ammonium source pellets including ammonium sulfate, phosphorus source pellets including an ammonium phosphate compound, e.g., monoammoinium phosphate, diammonium phosphate, triammonium phosphate, or a combination thereof, and potassium source pellets including potassium chloride, potassium phosphate, potassium nitrate, potassium sulfate, or a combination thereof. In further detail, the anti-fungal pelleted blend can be from 90 wt % to 100 wt % dissolvable in water at 20° C. within about 3 minutes, or can be from 95 wt % to 100 wt % dissolvable in water at 20° C. within about 2 minutes. Furthermore, the multiple types of dry pellets provide a total nitrogen content from about 15 wt % to about 40 wt %, a total phosphorus content from about 1.8 wt % to about 8.8 wt %, and a total potassium content from about 4.1 wt % to about 16.6 wt %. Notably, the ammonium sulfate and the ammonium phosphate compound both contribute to the total nitrogen content in addition to providing sulfur and phosphorus to the blend. If other compounds are present, and they exhibit water-solubility within these parameters, they can likewise contribute to the nitrogen, phosphorus, and potassium content values within these ranges.

In an alternative example, anti-fungal pelleted blends can include multiple types of dry pellets homogenously admixed together that collectively provide the following N-P-K values: N is from 15 to 40, P is from 4 to 20, and K is from 5 to 20. In this example, there is also a water-soluble protective coating coated on the multiple types of dry pellets. The water-soluble protective coating in this example includes a mineral source or mineral sources of boron, copper, iron, manganese, zinc, molybdenum, or a combination thereof. The plurality of pellets coated with the water-soluble protective coating are from 90 wt % to 100 wt % dissolvable in water at 20° C. within 3 minutes, or can be from 95 wt % to 100 wt % dissolvable in water at 20° C. within about 2 minutes. Thus, even with the presence of the coating composition, the anti-fungal pelleted blend still is nearly or fully dissolvable as described.

In another example, a method of treating turfgrass for fungal disease can include applying an anti-fungal pelleted blend of multiple types of dry pellets to soil covering plant roots of the turfgrass infected by a fungal disease at an average coverage density of about 0.005 pound to about 0.015 pound per square foot, and watering the turfgrass on a daily basis starting at a time from about 6:00 PM to about 12:00 AM midnight and completing watering prior to about 12:30 AM the next morning, e.g., finishing from about 6:10 PM to about 12:30 AM the next morning. The watering includes applying an average of ⅛ inch to ⅜ inch water to the turfgrass. The anti-fungal pelleted blend in this example includes a total nitrogen content from about 15 wt % to about 40 wt %, a total phosphorus content from about 1.8 wt % to about 8.8 wt %, and a total potassium content from about 4.1 wt % to about 16.6 wt %. Furthermore, from about 90 wt % to 100 wt % of the anti-fungal pelleted blend is dissolved on the turfgrass and turfgrass soil within about 20 minutes after watering is complete, or from about 95 wt % to about 100 wt % of the anti-fungal pelleted blend is dissolved on the turfgrass and turfgrass soil within about 15 minutes after watering is complete.

In these examples, there are various parameters that are used to describe the contents or compounds in the anti-fungal pelleted blend, or more specifically in one of the pellets of the pelleted blend. Nitrogen content is characterized by the weight percentage of nitrogen (N) that is present in the anti-fungal pelleted blend is the same number that is used when describing nitrogen content using the N-P-K system, which are shown without units. When referring to phosphorus (P) and potassium (K) in the N-P-K system, the values do not directly correlate with the weight percentage of phosphorus and potassium, respectively.

Thus, when referring to the anti-fungal pelleted blends of the present disclosure that can be used to prevent and/or treat a fungal infection, relative concentrations or amounts of nitrogen (N), phosphorus (P), and (K) can be provided in terms of actual weight percent of these elements, or alternatively, using the "N-P-K rating" system, which typically uses three numbers separated by two dashes. With the N-P-K rating system, the first number refers to the total elemental nitrogen (N) content (not the total concentration of the nitrogen source). The total nitrogen content can be provided by any of a number of sources, such as urea, ammonium, nitrates, etc. As mentioned, the weight percentage of nitrogen in a compound or composition will be the same as the N-P-K value for nitrogen (N). On the other hand, the phosphorus (P) and Potassium (K) values are not as straightforward. The P value and the K value each refer to a conventional shorthand value for the amount of phosphorus and potassium, respectively, that is present based on standard comparative compounds (which may or may not be present in the composition, but rather are used for reference or convention). For phosphorus (P), this number is referred to as "available phosphate" value and is based on the standard compound phosphorus pentaoxide, or $P_2O_5$, where P makes up about 0.436 of the molar mass of the compound, whether or not $P_2O_5$ is present or not. For potassium (K), this number is referred to as "water-soluble potash" or "soluble potassium" and is based on the standard compound potassium oxide, or $K_2O$, where K makes up about 0.83 of the molar mass of the compound, whether or not $K_2O$ is present or not. Thus, an N-P-K rating of 20-10-10, for example, means that in the pelleted composition, or individual pellet thereof, there is i) 20 wt % of actual nitrogen (N) content, ii) the equivalent of phosphorus that would be present in $P_2O_5$, e.g., about 4.36 wt % of phosphorus (P) content, and iii) the equivalent amount of potassium that would be available in soluble potash based on $K_2O$, e.g., about 8.3 wt % of potassium (K) content. As another example, a 15-30-15 pelleted composition, or pellet thereof, would contain 15 wt % elemental nitrogen (N) content, 30 wt %×0.436=13.8 wt % elemental phosphorus (P) content, and 15 wt %×0.83=12.45 wt % elemental potassium (K) content. Thus, in some instances, the present disclosure refers to the actual elemental content, by weight percent, of nitrogen, phosphorus, and potassium, and in other locations, the N-P-K values are alternatively provided, depending on the context. Furthermore, it is notable that in some instances, other elements are notated as a fourth element, such as sulfur (S), denoted as +X, where X is the weight content of sulfur, e.g., 16-20-0+13 may denote 16 nitrogen, 20 available phosphate (as calculated), 0 potassium, and 13 sulfur, which is calculated similar to nitrogen, which is by weight content.

In further detail, when phosphorus and/or potassium are expressed as a weight percentage, or when using the terms "phosphorus content" or "potassium content," it is noted that this refers to the actual content (by weight percent) of the element phosphorus (P) or potassium (K), respectively that is present, excluding other elements that may be present in the compound. On the other hand, when referring to "available phosphate" for the phosphate compounds, and "water-soluble potash" or "soluble potash" for the potassium compounds, this refers to the content of phosphorus or potassium as defined using the N-P-K rating system defined above.

When referring to compounds other than the N-P-K content, ingredients are typically provided in actual weight percentages of the elemental content in the anti-fungal pelleted blends or individual pellets, and can include other compounds as sources for the elemental content of sulfur (S), boron (B), copper (Cu), iron (Fe), manganese (Mn), molybdenum (Mo), zinc (Zn), etc.

In accordance with this, the anti-fungal pelleted blends described herein can have alternative N-P-K values with respect to the pelleted blend as a whole. Examples include blends where N is from 15 to 40, from 20 to 36, from 22 to 36, from 24 to 32, from 26 to 35, or from 27 to 29; P is from 4 to 20, from 6 to 15, or from 8 to 12; and K is from 5 to 20, from 6 to 15, or from 8 to 12; or any combination of these ranges thereof.

Regarding the various dry pellets that are included in the anti-fungal pelleted blends, in one example, there can be a urea source pellet. Urea, or $CO(NH_2)_2$, has a molecular weight of about 60.06 g/mol and a water-solubility of about 1079 g/L, which is highly water-soluble. The nitrogen content provided by urea is about 46.6 wt %. The urea source pellets include urea, and may in some instances include other minor amounts of compositional components used for forming and retaining the shape of the pellets. As an example, urea source pellets having an N-P-K content of 46-0-0 which takes into account any other compositional components, if included at about 50 wt % of the blend, then the nitrogen content based on 46.6 wt % nitrogen content in urea would provide about 23.3 wt % of the nitrogen content as urea nitrogen. Similar calculations can be carried out for other urea source pellets that may include other ingredients and/or which are added at a different weight percentage of the anti-fungal pelleted blend.

Other types of pellets in the anti-fungal pelleted blend can likewise provide additional nitrogen, such as ammoniacal nitrogen, nitrogen from nitrates, etc. These nitrogen sources may or may not contribute to the phosphate (P) and/or the potassium (K) content. For example, ammonium source pellets can also be included in the blend, such as an ammonium phosphate compound or ammonium sulfate. As an example, the ammonium phosphate compound can be included in the form of monoammonium phosphate. In other examples, the ammonium phosphate compound can include or be diammonium phosphate, triammonium phosphate (commonly referred to as ammonium phosphate). Any combination of these can likewise be used. Using monoammonium phosphate as an example, monoammonium phosphate pellets having an N-P-K content of 11-52-0, which takes into account any other significant compositional components therein, if included at about 20 wt % of the blend, then the nitrogen content based on about 11 wt % nitrogen content in monoammonium phosphate would provide about 2.2 wt % of the nitrogen content (to be added to the nitrogen content provided by the urea). Likewise, monoammonium phosphate also contributes to the total available phosphate, which if the N-P-K value for phosphorus is about 52 (taking into account other components that may be present), then the total available phosphate (P) value will be about 10.4. With respect to ammonium sulfate, if that is provided by a separate pellet, e.g., 21-0-0 (+24 for the sulfur), and that pellet is blended at about 10 wt % of the total blend, then the nitrogen provided by the ammonium sulfate will be 2.1, or 2.1 wt % nitrogen content. Thus, in this example, the urea, the ammonium phosphate, and the ammonium sulfate, which are included as three different pellets, all contribute to the nitrogen content of about 28, and a phosphate content of about 10.4 (or about 4.5 wt % phosphorus content). As a note, there can also be phosphate pellets that do not contribute to the nitrogen content, but rather may contribute to the nitrogen or the potassium. In other examples, potassium phosphate pellets, or pellets containing potassium phosphate, can be used to contribute to both the total available phosphate (P valued) and the soluble potash (K value).

As indicated previously, the anti-fungal pelleted blend may include potassium source pellets as well. The potassium source pellets may include, for example, potassium chloride (sometimes referred to as muriate of potash). Other potassium compounds of the pellet may include potassium phosphate, potassium nitrate, potassium sulfate, etc. Potassium phosphate would increase the phosphorus content and total "available phosphate" value, and potassium nitrate would increase the total nitrogen content. Using potassium chloride (KCl) as an example, muriate of potash pellets may have available potassium (sometimes referred to as "soluble pot-ash" value) based on an N-P-K value of 0-0-60. Potassium chloride is highly water-soluble (344 g/L, at 20° C.) and can be readily dissolved into the soil after water contact, Thus, if the muriate of potash is provided by a separate pellet, and that pellet is blended at about 15 wt % of the total blend, then the potassium provided by the potassium chloride will be about 9, or about 7.5 wt % potassium content Similar calculations can be carried out for other urea source pellets that may include other ingredients and/or which are added at a different weight percentage of the anti-fungal pelleted blend. Table 1 below provides a few example nitrogen, phosphorus, and/or potassium source compounds that can be present in various pellet blends or that can be present alone in pellets. The sources also include the chemical structure, the mass/weight, and the water-solubility at 20° C. Fractional weights of the individual elements by N, P, or K content is provided. The available phosphate as a fraction (based on $P_2O_5$) and available potassium (or soluble potash value based on $K_2O$) that can be used to calculate weight percentages and/or N-P-K values are also included. Notably, the fraction for the N content will be the same for both weight percent and N-P-K value calculations.

TABLE 1

| Source Structure Mass/Weight Solubility (20° C.) | N Content (weight fraction) | P Content (weight fraction) | Available Phosphate Value ($P_2O_5$) | K Content (weight fraction) | Soluble Potash Value ($K_2O$) |
|---|---|---|---|---|---|
| Example Nitrogen Sources | | | | | |
| Urea $CO(NH_2)_2$ 60.06 g/mol 1079 g/L | 0.466 | — | — | — | — |
| Ammonium Nitrate $NH_4NO_3$ 80.04 g/mol 1500 g/L | 0.335 | — | — | — | — |
| Ammonium Phosphate $(NH_4)_3PO_4$ 149.09 g/mol 580 g/L (at 25° C.) | 0.28 | 0.207 | 0.52 | — | — |
| Diammonium Phosphate $(NH_4)_2PO_4H$ 132.06 g/mol 360 g/L | 0.21 | 0.235 | 0.54 | — | — |
| Monoammonium Phosphate $NH_4H_2PO_4$ 115.025 g/mol 360 g/L | 0.12 | 0.269 | 0.617 | — | — |
| Ammonium Sulfate $(NH4)_2SO_4$ 132.14 g/mol 744 g/L | 0.212 | — | — | — | — |
| Potassium Nitrate $KNO_3$ 101.1 g/mol 316 g/L | 0.13 | — | — | 0.387 | 0.45 |
| Example Phosphate Sources | | | | | |
| Potassium Phosphate $K_3PO_4$ 212.27 g/mol Freely soluble | — | 0.146 | 0.335 | 0.55 | 0.662 |
| Ammonium Phosphate $(NH_4)_3PO_4$ 149.09 g/mol 580 g/L (at 25° C.) | 0.28 | 0.207 | 0.52 | — | — |
| Monoammonium Phosphate $NH_4H_2PO_4$ 115.025 g/mol 360 g/L | 0.12 | 0.269 | 0.617 | — | — |
| Potassium Sources | | | | | |
| Potassium Phosphate $K_3PO_4$ 212.27 g/mol Freely soluble | — | 0.146 | 0.335 | 0.55 | 0.662 |

TABLE 1-continued

| Source Structure Mass/Weight Solubility (20° C.) | N Content (weight fraction) | P Content (weight fraction) | Available Phosphate Value (P₂O₅) | K Content (weight fraction) | Soluble Potash Value (K₂O) |
|---|---|---|---|---|---|
| Potassium Nitrate KNO₃ 101.1 g/mol 316 g/L | 0.13 | — | — | 0.387 | 0.45 |
| Potassium Sulfate K₂SO₄ Sulfate of Potash 174.26 g/mol 111 g/L | — | — | — | 0.449 | 0.5 |
| Potassium Chloride KCl Muriate of Potash 74.55 g/mol 344 g/L | — | — | — | 0.524 | 0.63 |

NOTE - values for Nitrogen, Phosphorus, and Potassium are based on theoretical calculation, and thus, can be slightly different as pellets in blends.

In other examples, the anti-fungal pelleted blend can include a mixture of dry blended pellets that include urea source pellets that provide from about 22 wt % to about 36 wt % of the nitrogen content to the anti-fungal pelleted blend; ammonium source pellets that include one or more of ammonium nitrate, ammonium phosphate, dimonoammonium phosphate, monoammonium phosphate, or ammonium sulfate that provide(s) from about 1 wt % to about 5 wt % of the nitrogen content to the anti-fungal pelleted blend; phosphorus source pellets that include one or more of potassium phosphate, ammonium phosphate, diammonium phosphate, or monoammonium phosphate that provide(s) from about 1.8 wt % to about 8.8 wt % of the phosphorus content to the anti-fungal pelleted blend, and potassium source pellets that include one or more of potassium phosphate, potassium nitrate, potassium sulfate, or potassium chloride that provide(s) from about 4.1 wt % to about 16.6 wt % of the phosphorus content to the anti-fungal pelleted blend. In some examples, the anti-fungal pelleted blend can include urea source pellets, ammonium source pellets, phosphorus source pellets including an ammonium phosphate compound, and potassium source pellets including potassium chloride, potassium phosphate, potassium nitrate, potassium sulfate, or a combination thereof. In other examples, the anti-fungal pelleted blend can include urea source pellets, ammonium source pellets including ammonium sulfate, phosphorus source pellets including monoammonium phosphate, and potassium source pellets including potassium chloride.

Regarding the various types of pellets used in the mixture of pellets, the particle size(s) can vary, but in one example, an average particle size of all of the pellets can be from about 0.5 mm to about 3 mm, from about 1 mm to about 2.5 mm, or from about 1 mm to about 2 mm. The size of the pellets can contribute to the fast dissolving nature of the pellets when they are applied to the plant and soil. In accordance with examples of the present disclosure, the mixture of various pellets, e.g., the urea source pellets, the ammonium source pellets, the phosphorus source pellets, the potassium source pellets, etc., can all be formulated to be water-soluble at greater than 100 g/L at 20° C., greater than 200 g/L at 20 C°, greater than 250 g/L at 20 C°, or greater than 300 g/L at 20 C°.

With respect to the coating compositions that can be applied to the anti-fungal pelleted blends of the present disclosure, in some examples, a coating composition can include water, a water-soluble carrier polymer, and a blend of mineral nutrients that can assist with the anti-fungal properties of the blends described herein. For example, the various source pellets may be coated with a thin, water-soluble coating, including minerals such as boron, copper, iron, manganese, zinc, molybdenum, and/or the like. Sonic of the minerals may be in the form of chelated minerals, e.g., EDTA minerals, such as chelated copper, chelated iron, chelated manganese, chelated zinc, etc., or a combination thereof. These minerals may also be complexed or from other mineral sources. Other compounds that can be present may include boric acid, ammonium molebdate, etc. The supplemental minerals can include a combination of three or more, four or more, five or more, or all six of the supplemental minerals, e.g., boron, copper, iron, manganese, zinc, or molybdenum. The anti-fungal pelleted blend can include, for example, a coating that provides from 0.005 wt % to 0.05 wt % boron content, from 0.01 wt % to 0.2 wt % copper content, from 0.05 wt % to 0.3 wt % iron content, from 0.01 wt % to 0.2 wt % manganese content, from 0.01 wt % to 0.2 wt % zinc content, and/or from 0.0001 wt % to 0.002 wt % molybdenum content, based on the total weight of the anti-fungal pelleted blend.

Turning now to the methods of treating turfgrass for fungal disease, such methods can include applying an anti-fungal pelleted blend of multiple types of dry pellets to soil covering plant roots of the turfgrass infected by a fungal disease at an average coverage density of about 0.005 pound to about 0.015 pound per square foot, and watering the turfgrass on a daily basis starting at a time from about 6:00 PM to about 12:00 AM midnight and completing watering prior to about 12:30 AM the next morning, e.g., finishing from about 6:10 PM to about 12:30 AM the next morning. The watering includes applying an average of ⅛ inch to ⅜ inch water to the turfgrass. The anti-fungal pelleted blend in this example includes a total nitrogen content from about 15 wt % to about 40 wt %, a total phosphorus content from about 1.8 wt % to about 8.8 wt %, and a total potassium content from about 4.1 wt % to about 16.6 wt %. Furthermore, from about 90 wt % to 100 wt % of the anti-fungal pelleted blend is dissolved on the turfgrass and turfgrass soil within about 20 minutes after watering is complete, or from about 95 wt % to about 100 wt % of the anti-fungal pelleted blend is dissolved on the turfgrass and turfgrass soil within about 15 minutes after watering is complete.

Whether for preventative treatment or for treating against an existing fungal infection, in many instances, watering can begin on a daily basis after the temperature drops below about 70° F., but early enough in the evening that the turfgrass or other plant and soil has time to dry before the temperature reaches 70° F. the next afternoon. In most instances and climates, that may mean starting the daily watering between about 5:30 PM and midnight, and finishing watering before about 12:30 AM (the next morning) or so. As an example, an ambient relative humidity where treating occurs at the hottest time of day on 75% to 100% of the days of the time frame for treatment ay be from about 20% to about 50% R.H., and a temperature where treating occurs at the hottest time of day on 75% to 100% of the days ranges may range from about 85° F. to about 105° F. These temperature and humidity profiles will provide good anti-fungal results by waiting until the temperature drops below 70° F. and completing watering late that same evening or very soon after midnight so that when the temperature reaches 70° F. the next day, there is insufficient moisture remaining for the fungus to thrive, Using the anti-fungal pelleted blends and watering protocols described herein can result in effective anti-fungal treatment without the need or use of added chemical fungicides that are often used to try to combat fungi.

The anti-fungal pelleted blend in the form of dry pellets can be spread using a standard lawn spreader device, such as a Scotts® Classic spreader or other spreader device. Hand held drop or broadcast spreaders or spreaders on wheels that either drop the pellets, or which laterally scatter or broadcast the pellets therefrom, can be used.

Alternatively, the user could dissolve the anti-fungal pelleted blend in a water solution and apply it at the same coverage density as would be applied when using a particulate spreader, e.g., excluding the water content (typically calculated by weight). In the form of a diluted solution, a higher volume is applied to the turfgrass to put down the same coverage density of the anti-fungal pelleted blend. For example, the dry anti-fungal particulates can be dissolved/suspended in water at a 5 pound particulate to 3 gallon water ratio (about a 1:4 weight ratio). Other examples of solution ratios that can be prepared include dry anti-fungal particulate to water weight ratios of 1:2 to 1:7, from 1:3 to 1:6, or from 1:3 to 1:5. Regardless of whether it is diluted or not, the application can be within a range to provide anti-fungal properties where the turfgrass or other plants can outcompete the fungal infection, for example.

As mentioned, the nitrogen content can be provided by urea and ammonium complexes, for example, providing some ammoniacal nitrogen, Nitrates can likewise be used in addition to the urea, such as in part of an ammonium or other nitrate complex, e.g. ammonium nitrate, potassium nitrate, etc. The phosphorus content can be provided by an ammonium phosphate compound, such as monoammonium phosphate, diammonium phosphate, or standard ammonium phosphate (with three ammonium groups). Phosphates can increases or supplemented by the presence of other sources, such as potassium phosphate, potassium nitrate, etc., for example. The potassium content can be provided by muriate of potash, which is potassium chloride. Potassium chloride is highly water soluble, so it can be solubilized quickly when applied to the soil and turfgrass and then immediately watered. Other potassium sources may include potassium phosphate, potassium nitrate, potassium sulfate, or a combination thereof. In addition to the nitrogen content, the phosphorus content, and the potassium content that can be present, other elements or compounds can be present, such as sulfur, e.g., from ammonium sulfate.

Application of the anti-fungal pelleted blends of the present disclosure can be based on a "coverage density" of pounds per square foot, which can be converted easily to pounds per 1000 square feet (often used in describing application of fertilizer to turfgrass for purposes of general grass fertilization), Pounds per square foot are used in this instance because when treating a turfgrass fungal infection such as Necrotic Ring Spot, for example, it may not be needed to apply 1000 square feet, and so to avoid confusion, a smaller unit of area coverage is used to make clear that the present anti-fungal pelleted blends can be applied to either small areas or to large areas, depending on the circumstances.

In accordance with the present disclosure, it has been generally found that there are two methodologies that are practiced together to provide success in treating a turfgrass fungal disease, namely application of the anti-fungal pelleted blend, e.g., nitrogen content, presence of phosphorus and potassium, and coverage density, and watering profile, e.g., frequency, time of day, and amount of water applied. Both of these methodologies have specific parameters that can lead to success if practiced within certain range profiles, and surprisingly, deviation from these parameters may not be as effective, and in some cases can be counter-productive.

With specific reference to the application of the anti-fungal pelleted blend, the composition can be prepared to have a nitrogen content from 15 wt % to 40 wt % (or any of the other sub-ranges described herein), and within this range, the coverage density on the turfgrass and turfgrass soil can be from 0.005 pound to 0.0125 pound per square foot. Thus, regardless of whether it is applied as dry anti-fungal particulates or as a diluted anti-fungal solution, within this range of nitrogen content, the coverage density can provide the correct amount of nitrogen to the turfgrass. In further detail, in some examples, the anti-fungal pelleted blend can also include from about 1.8 wt % to about 8.8 wt % phosphorus content and from about 4.1 wt % to about 16.6 wt % potassium content. Thus, the anti-fungal pelleted blends of the present disclosure can use conventions commonly used in describing the contents in fertilizer, such as the N-P-K rating system with an "N" value from about 15 to about 40, a "P" value from about 5 to about 20, and a K value from about 5 to about 20. This range of combinations of N-P-K rating system values applied at the coverage densities described herein can be particularly effective. Example N-P-K anti-fungal pelleted blend compositions that can be used include pelleted blend compositions formulated and rated 20-10-10, 20-20-20, 28-10-10, 40-20-10, 15-20-10, 30-10-10, 40-10-10, 40-15-5, 30-10-5, 34-10-10, 15-5-5, 40-20-20, etc., though any anti-fungal pelleted blend within the N value ranges, P value ranges, and K value ranges described herein can be used if there is enough of each of the N-P-K content to provide for anti-fungal properties as described herein.

When the anti-fungal pelleted blend selected or prepared is correct for treating a turfgrass fungal disease, the average coverage density is the next element of application to consider. It has been found that an application coverage density of the anti-fungal pelleted blend can be applied at a coverage density from 0.005 pound to 0.015 pound per square foot. In further detail, the coverage density can be from 0.005 pound to 0.0125 pound, from 0.005 pound to 0,0110 pound, from 0.005 pound to 0.0105 pound, from 0.005 pound to 0.0100 pound, from 0.0075 pound to 0.0125 pound, or from 0.0085 pound to 00115 pound per square foot. These ranges can be selected based on the severity of the fungal infection, the proximity to infected turfgrass, the climate conditions, or other factors. For example, with respect to Necrotic Ring Spot, treating the turfgrass can include causing a visibly-active Necrotic Ring Spot fungal infection to go dormant to allow the turfgrass to return to a condition where the visibly-active Necrotic Ring Spot is no longer visible. In some examples, this can occur using an average coverage density of the anti-fungal pelleted blend that is about 0.0075 pound to about 0.015 pound per square foot. Alternatively (or additionally to other areas of the turfgrass), treating can include preventing a visibly-active Necrotic Ring Spot fungal infection from spreading to other areas of turfgrass not affected by the Necrotic Ring Spot fungal infection, or can include preventing a Necrotic Ring Spot fungal infection from infecting a continuous area of turfgrass that is uninfected. In some examples, this can occur at an average coverage density of the anti-fungal pelleted blend that is about 0.005 pound to about 0.0125 pound per square foot. The term "visibly-active" indicates the presence of a fungus in the soil, at roots, and/or at blade-like leaves or turfgrass so that disease symptoms are visible upon inspection by a horticulturist or other expert on site, without the need for chemical or biological testing. For Necrotic Ring Spot, for example, there is a characteristic relatively large yellow ring that forms in otherwise greener turfgrass that would be apparent to a horticulturist, but also to a lawn care professional or even a lay person. Other fungi can be visibly-active or visibly apparent to an expert upon closer visual inspection of the soil, roots (upon pulling a few samples), or blade-like leaves, for example.

In one specific example, treating the turfgrass for a fungal infection, such as Necrotic Ring Spot, can include both causing a visibly active fungal infection to go dormant to allow the turfgrass to return to a condition where the visible fungal infection is no longer visible, and preventing a visibly-active fungal infection from spreading to other areas of turfgrass not affected by the Necrotic Ring Spot fungal infection, or preventing a new growth of Necrotic Ring Spot fungal infection from infecting other areas of the turfgrass not affected by the fungal infection. For example, treating may include causing a visibly-active fungal infection to be reduced or become dormant to allow the turfgrass to return to a condition where the visibly-active is no longer visible may include applying from about 0.005 pound to about 0.015 pound per square foot, or from about 0.0075 pound to about 0.0125 pound per square foot, for example. Application and watering can be carried out from 2 to 4 times in a season with from about 2 weeks to 6 weeks between treatments. Alternatively, treating includes applying the anti-fungal pelleted blend to prevent a fungal infection from occurring may include may include preventing a visibly-active fungal infection from spreading to other areas of turfgrass not affected by the fungal infection, preventing the fungal infection from infecting a continuous area of turf-grass that is uninfected, or preventing an outbreak of a visibly-active fungal infection. In these examples, the coverage density, often applied once or twice per season, can be at an average coverage density of anti-fungal pelleted blend from about 0.005 pound to about 0.015 pound per square foot, from about 0.005 pound to about 0.0125 pound, or from about 0.075 pound to about 0.0125 pound per square foot, for example.

After application of the anti-fungal pelleted blend, watering can be done the same day as pellet application followed by consistent watering as prescribed herein. When treating an active fungal infection, watering can be daily (in the evening as describe), with treatments ranging from once every 3-6 weeks for a total of 2 to 6 applications, once every 3-5 weeks for 3 to 4 applications, once every about 30 days for 3 or four applications, etc. It has also been found that by watering at from about 6:00 PM and 12:00 AM (Midnight), e.g., within this 6 hour window starting no earlier than about 6:00 PM in the evening and finishing prior to 12:30 AM the next morning, the soil can receive moisture as the lawn begins to cool down from the hottest time in the day (usually 2-8 hours prior to watering). In some examples, water can be started and completed at from 6:00 PM to 12:00 AM (midnight), from 7:00 PM to 11:00 PM, from 7:00 PM to 10:00 PM, from 8:00 PM to 11:00 PM. In fact, it was found that by watering the turfgrass outside of this general watering window, using the anti-fungal pelleted blend described herein can in some cases encourage additional fungal growth at this coverage density and water application profile. It is believed that watering between 6:00 PM and 12:00 AM (midnight) may give the turfgrass lawn adequate time to dry before the heat of the day, as a wet lawn during the heat of the day can encourage the fungal growth.

Using an alternative metric other than time frame for watering, watering can begin when the ambient temperature is cooled or cooling from the hottest time of day in combination with at a time when the soil falls below about 70° F. in temperature. When the soil temperature is above about 70° F. and the anti-fungal pelleted blend of the present disclosure is applied to the soil, fungal growth can be encouraged, such as observed as being the case with Necrotic Ring Spot fungal disease. Thus, rather than a time schedule for beginning to water the turfgrass, a combination of falling daily temperatures and soil temperature can be used to know when to begin watering, Watering within 1 hour or within 2 hours of when the soil drops to a temperature below about 70° F. can provide appropriate water levels to the turfgrass while maximizing the time for water to be used before the next day when the soil is again heated to above about 70° F.

Furthermore, in this example, it has been found that by not watering every day, e.g., every other day, or every third day, etc., does not provide enough water to effectively treat or prevent the fungal infection, as validated by example in the treatment of Necrotic Ring Spot. Thus, too much water during the heat of the day, or too little water during the cool hours of the evening and night can both lead to increased fungal growth, whereas the right amount of watering at the right time of day (while the lawn is cooling for the evening early enough to dry before the heat of the day) can lead to excellent results in treating Necrotic Ring Spot when the anti-fungal pelleted blend of the present disclosure is applied to the turfgrass lawn as prescribed.

In further detail, once the anti-fungal pelleted blend is applied with the appropriate formulation, coverage density, watering profile, and sometimes multiple applications, results can start to be seen over a period of about 2 to 3 weeks, with more noticeable results being visible at about 30 to 60 days, depending on the severity of the fungal infection. For example, in the case of turfgrass with visible evidence of the Necrotic Ring Spot fungal infection, the yellow rings that are characteristic of this type of fungus can become de minimis, or the lawn can even appear to be healthy without visible yellow rings associated with this fungus.

It is noted that in many cases, the fungal spores may or may not be necessarily killed, but rather using this protocol, can be forced into dormancy where the fungus cannot grow, but the spores may still remain. It has been found, for example, that excessive moisture when the soil is above about 70° F. can promote conditions for the fungus to grow and spread. Thus, the anti-fungal pelleted blends (relative concentrations of nitrogen and the presence of phosphorus and potassium), average coverage density of the anti-fungal pelleted blend, and watering profile (time of day, frequency, and water application volume) can be used to prevent even live fungal spores from growing and/or spreading. Without continued watering using this watering profile, for example, the fungus can return.

It is noted that, as used in this specification and the appended claims, the singular forms "a," "an," and "the" include plural referents unless the context clearly dictates otherwise. In describing and claiming the teachings of the present disclosure, the following terminology will be used in accordance with the definitions set forth below.

When discussing the anti-fungal pelleted blends or methods herein, these discussions can be considered applicable to other examples, whether or not they are explicitly discussed in the context of that example. Thus, for example, when discussing urea source pellets in the context of anti-fungal pelleted blends, such disclosure is also relevant to and directly supported in context of the methods and vice versa. It is also understood that terms used herein will have the ordinary meaning in the relevant technical field unless specified otherwise. In some instances, there are terms defined more specifically throughout the specification or included at the end of the present specification, and thus, these terms have a meaning consistent with these more specific definitions.

recited as the limits of the range, but also to include all the individual numerical values or sub-ranges encompassed within that range as if each numerical value and sub-range is explicitly recited.

As an illustration, a numerical range of "about 10 to about 50" should be interpreted to include not only the explicitly recited values of about 10 to about 50, but also to include individual values and sub-ranges within the indicated range. Thus, included in this numerical range are individual values such as 20, 30, and 40 and sub-ranges such as from 10-30, from 20-40, and from 30-50, etc. This same principle applies to ranges reciting only one numerical value. Furthermore, such an interpretation should apply regardless of the breadth of the range or the characteristics being described.

EXAMPLES

The following examples illustrate embodiments of the disclosure that are presently known. Thus, these examples should not be considered as limitations of the present disclosure, but are merely in place to teach how to make the useful compositions of the present disclosure based upon current experimental data.

Example 1—Anti-fungal Pelleted Blend 1

Example anti-fungal pelleted blends are prepared in accordance with Tables 2 and 3, as follows:

TABLE 2

| Anti-fungal Pelleted Blend 1 | | | | | | | |
|---|---|---|---|---|---|---|---|
| Pellet Source | N-P-K | Water Solubility (g/L; 20° C.) | Mass (g/mol) | Pellet (wt %) | N | P | K |
| Urea | 46-0-0 | 1079 | 60.06 | 52 | 23.9 | — | — |
| Ammonium Sulfate | 21-0-0 | 744 | 132.14 | 12 | 2.5 | — | — |
| Monoammonium Phosphate | 12-61-0 | 370 | 115.025 | 19 | 2.3 | 5 | — |
| Potassium Chloride | 0-0-60 | 344 | 74.55 | 17 | — | — | 8.5 |
| Total (wt %) | — | — | — | 100 | 28.7 | 5 | 8.5 |
| N-P-K Values | — | — | — | — | 28.7 | 11.5 | 10.2 |

Sulfur Content ranging from about 2-3 wt %

TABLE 3

| Anti-fungal Pelleted Blend 2 | | | | | | | |
|---|---|---|---|---|---|---|---|
| Pellet Source | N-P-K | Water Solubility (g/L; 20° C.) | Mass (g/mol) | Pellet (wt %) | N | P | K |
| Urea | 46-0-0 | 1079 | 60.06 | 46 | 23.9 | — | — |
| Ammonium Sulfate | 21-0-0 | 744 | 132.14 | 12 | 2.5 | — | — |
| Diammonium Phosphate | 18-46-0 | 360 | 132.06 | 22 | 4.8 | 4.4 | — |
| Potassium Nitrate | 13-0-44 | 316 | 101.1 | 20 | 2.6 | — | |
| Total (wt %) | — | — | — | 100 | 33 | 4.4 | 7.3 |
| N-P-K Values | — | — | — | — | 28.7 | 10.1 | 8.8 |

Sulfur Content ranging from about 2-3 wt %

Concentrations, amounts, and other numerical data may be expressed or presented herein in a range format. It is to be understood that such a range format is used merely for convenience and brevity and thus should be interpreted flexibly to include not only the numerical values explicitly In this example, the anti-fungal pelleted blends are prepared using four distinct pellets blended together, as shown in Tables 2 and 3, but could be prepared in some instances using fewer or more types of pellets. The average pellet size of the anti-fungal pelleted blends can be from about 0.5 mm to about 3 mm, but in this example are from about 1.5 mm to about 2.25 mm in average pellet size.

Example 2—Application of Mineral Blend to Anti-fungal Pelleted Blend

The anti-fungal pelleted blend of Tables 2 or 3 may be coated with a coating composition that includes a water-soluble polymer carrier and a mineral blend that may assist with plant health and enhance the anti-fungal properties of the blend. The mineral blend in this example includes about 0.02 wt % boric acid, 0.0005 wt5% ammonium molybdate, 0.05 wt % copper EDTA, 0.1 wt % iron EDTA, 0.05 wt % manganese EDTA, and 0.05 wt % zinc EDTA, based on a total weight of the anti-fungal pelleted blend. The mineral blend coating applied to the anti-fungal pelleted blend can be highly water-soluble, dissolving from the surface quickly upon contact with water, e.g., within a few seconds to a few minutes.

Example 3—Application of Anti-fungal Pelleted Blend 1 to Treat Turfgrass for Necrotic Ring Spot Disease On a day in June where the temperature peaked from about 90-100° F. with a relative humidity of about 20% to about 40%, in the evening (between 6:00 PM and 7:00 PM), the anti-fungal pelleted blend of Example 1 (Table 2), which included guaranteed N-P-K values of about 28-10-10, a 2-3 wt % sulfur content, and the mineral blend described in Example 2, may be spread on a turfgrass lawn as a preventative measure against necrotic ring spot. In further detail, the same protocol is followed to treat against an active fungal infection or disease, but the process is repeated at day 30 (in July) and at day 60 (in August) following the initial application in June.

To treat against fungus (preventative or active infection), the treatment occurs in the evenings after the hottest temperature of the day has past and the air is cooling down, e.g., from about 6:00 PM to about 12:00 AM midnight, completing watering well prior to morning daylight occurs again, e.g., prior to about 12:30 AM the next morning. Application of water to the turfgrass includes applying an average of ⅛ inch to ⅜ inch water to the turfgrass, but typically about ¼ inch of water. Within about 15-20 minutes, more than about 90-95 wt % of the anti-fungal pelleted blend (including the water-soluble coating) dissolves at the site of the turfgrass and soil. After the initial watering where the anti-fungal pelleted blend is essentially completely dissolved, every day after that the lawn is watered at about ¼ inch (again finishing watering prior to 12:30 AM), giving the lawn plenty of time to dry out each day between watering. Watering every day, but allowing plenty of drying time before temperatures exceed about 70° F., has been found to be more effective for treating necrotic ring spot than watering every 2 or 3 days. Necrotic ring spot seems to thrive better in moist environments above about 70° F., so during treatment, the watering protocol can be designed to provide dry turfgrass, as may be practical or possible, in between watering events. Many lawns with fungal infections are watered early in the morning so that the turfgrass is still wet when the temperature increases above 70° F., and thus the fungal spores are allowed to thrive. At the same time, lawns watered every-other-day, or every 3 days, may need to receive too much water at once, which can also promote extra retained water during the heat of the day, also allowing the fungal spores to thrive, Thus, early evening and evening watering on a more frequent basis (daily) with more time to dry before the heat of the day (the next day) can provide a good watering protocol to treat against necrotic ring spot.

For treatment against an active necrotic ring spot infection, the anti-fungal pelleted blend is applied three times over 60 days (at Day 1, Day 30, and Day 60) using a drop or broadcast spreader at a rate of about 10 pounds per 1000 square feet. After three treatments and following watering protocols, damaged areas of lawn can heal and grow back, but in some cases, new turfgrass seed or sod may be added. For example, soil may now be in condition to accept new seed or sod, whereas before treatment, the soil may not have been able to accept seed or sod.

For preventative treatment, the anti-fungal pelleted blend is applied once using a drop or broadcast spreader at a rate of about 10 pounds per 1000 square feet to prevent new funguses from growing. This can be done each year after treatment against an active infection as described above, or can be done prior to any infection presenting itself as a prophylactic measure.

Notably, these amounts of nutrients added to turfgrass to treat against fungal infections would be considered too much to act as an effective fertilizer, as normally these amounts could burn the grass. However, when applied as directed, due to the high water-solubility where pellets that do not otherwise remain on the grass after the initial evening watering activity, the turfgrass does not get damaged. However, due to the high concentration of nutrients, if pre-emergents and/or weeds grow in response to this treatment, these can be safely treated using weed control. Furthermore, in some examples, there is no need for using fertilizer in addition to the application of the anti-fungal pelleted blend, though additional fertilizer could be used in some instances at other time frames.

Example 4—Results

An active fungal infection of necrotic ring spot was treated in accordance with Example 3, with the following results:

1. Two (2) weeks after the first application of the anti-fungal pelleted blend (Anti-fungal Pelleted Blend 1 With Mineral Coating, or Coated Blend 1) to a portion of a lawn with proper daily ¼ inch watering starting at about 6:00 PM to about 7:00 PM in the evenings, areas receiving Coated Blend 1 showed greatly improved overall turf health and greening of turf compared to areas where Blend 1 was not applied.
2. Thirty (3) days later, when the second application of Coated Blend 1 was applied, noticeable increased turf health, and areas where there was a fungal infection began to exhibit new lawn growth. The soil at this point had mostly healed, and the root system of the turf began to show signs of growth where prior growth was not present.
3. Thirty (30) days later, when the third application of Coated Blend 1 was applied, continued increase in overall plant health was observed, and fungus-infected areas began to fill in. Watering procedures were verified to have been followed, and no new signs of fungus were noted. The soil at this point appeared to have been healed, and the turf began to grow on its own. Over-seeding or sod may be applied if there is a need or desire to accelerate the presence of a healthy lawn.
4. Thirty (3) days after the third application of Coated Blend with continued following of the daily watering protocols, the lawn health was greatly improved, fungal areas were 80% filled in with new turf (where turf can grow in on its own), and no sign of any new fungal infection was verified.

It is to be understood that the above-referenced arrangements are only illustrative of the application for the principles of the present disclosure. Numerous modifications and alternative arrangements can be devised without departing from the present disclosure. While the present disclosure has been described above with particularity and detail in connection with what is presently deemed to be the most practical embodiment(s) of the disclosure, it will be apparent that numerous modifications can be made without departing from the principles and concepts of the disclosure as set forth herein.

What is claimed is:

1. An anti-fungal pelleted blend, comprising:
multiple types of dry pellets homogenously admixed together, wherein the multiple types of dry pellets collectively have N-P-K values where:
N is from 20 to 40,
P is from 4 to 20, and
K is from 5 to 20; and
a water-soluble protective coating coated on the multiple types of dry pellets, the protective coating including a mineral source or mineral sources of boron, copper, iron, manganese, zinc, molybdenum, or a combination thereof,
wherein the multiple types of dry pellets coated with the water-soluble protective coating are from 90 wt % to 100 wt % dissolvable in water at 20° C. within 3 minutes.

2. The anti-fungal pelleted blend of claim 1, wherein the multiple types of dry pellets comprise one or more type of source pellets including potassium source pellets comprising potassium chloride.

3. The anti-fungal pelleted blend of claim 2, wherein the multiple types of dry pellets comprise one or more type of source pellets including potassium phosphate, potassium nitrate, potassium sulfate, or a combination thereof.

4. The anti-fungal pelleted blend of claim 1, wherein the multiple types of dry pellets comprise urea source pellets, ammonium source pellets, phosphorus source pellets, and potassium source pellets, wherein the urea source pellets, the ammonium source pellets, the phosphorus source pellets, and the potassium source pellets are each water-soluble at greater than 100 g/L at 20° C.

5. The anti-fungal pelleted blend of claim 4, wherein the urea source pellets, the ammonium source pellets, the phosphorus source pellets, and the potassium source pellets are each water-soluble at greater than 300 g/L at 20° C.

6. The anti-fungal pelleted blend of claim 1, wherein the water-soluble protective coating comprises from about 0.05 wt % to about 0.5 wt % of a total weight of the anti-fungal pelleted blend.

7. The anti-fungal pelleted blend of claim 1, wherein the mineral source or mineral sources include chelated copper, chelated iron, chelated manganese, chelated zinc, boric acid, ammonium molebdate, or a combination thereof.

8. The anti-fungal pelleted blend of claim 1, wherein the mineral source or mineral sources include four or more of boric acid, ammonium molybdate, copper EDTA, iron EDTA, manganese EDTA, or Zinc EDTA.

9. The anti-fungal pelleted blend of claim 1, wherein the N-P-K values are:
N is from 22 to 36,
P is from 6 to 15, and
K is from 6 to 15.

10. The anti-fungal pelleted blend of claim 1, wherein the multiple types of dry pellets include:
urea source pellets;
ammonium source pellets including ammonium sulfate;
phosphorus source pellets including an ammonium phosphate compound; and
potassium source pellets including potassium chloride, potassium phosphate, potassium nitrate, potassium sulfate, or a combination thereof.

11. The anti-fungal pelleted blend of claim 1, wherein the multiple types of dry pellets include:
urea source pellets;
ammonium source pellets including ammonium sulfate;
phosphorus source pellets including monoammonium phosphate; and
potassium source pellets including potassium chloride.

12. The anti-fungal pelleted blend of claim 1, wherein the multiple types of dry pellets coated with the water-soluble protective coating have a water solubility of at least about 100 g/L.

13. The anti-fungal pelleted blend of claim 1, wherein the water-soluble protective coating provides one or more of from 0.005 wt % to 0.05 wt % boron content, from 0.01 wt % to 0.2 wt % copper content, from 0.05 wt % to 0.3 wt % iron content, from 0.01 wt % to 0.2 wt % manganese content, from 0.01 wt % to 0.2 wt % zinc content, from 0.0001 wt % to 0.002 wt % molybdenum content, or a combination thereof, based on the total weight of the anti-fungal pelleted blend.

14. The anti-fungal pelleted blend of claim 1, wherein the multiple types of dry pellets comprise one or more type of source pellets including monoammonium phosphate, diammonium phosphate, triammonium phosphate, or a combination thereof.

15. The anti-fungal pelleted blend of claim 1, wherein the multiple types of dry pellets comprise phosphorus source pellets including monoammonium phosphate and potassium source pellets including potassium chloride.

16. A method of treating turfgrass for fungal disease, comprising:
applying the anti-fungal pelleted blend of claim 1 to soil covering plant roots of the turfgrass infected by a fungal disease at an average coverage density of about 0.005 pound to about 0.015 pound per square foot; and
watering the turfgrass on a daily basis starting at a time from about 6:00 PM to about 12:00 AM midnight and completing watering prior to about 12:30 AM the next morning, wherein watering includes applying an average of ⅛ inch to ⅜ inch water to the turfgrass, and wherein the 90 wt % to 100 wt % of the multiple types of dry pellets coated with the water-soluble protective coating is are dissolved on the turfgrass and turfgrass soil within about 20 minutes after watering in complete.

17. The method of claim 16, wherein treating includes causing a visibly-active fungal infection to go dormant to allow the turfgrass to return to a condition where the visibly-active fungal infection is no longer visible, and wherein an average coverage density of the anti-fungal pelleted blend is about 0.0075 pound to about 0.015 pound per square foot.

18. The method of claim 17, wherein applying and watering is carried out from 2 to 4 times in a season with from about 2 weeks to 6 weeks between treatments.

19. The method of claim 16, wherein the water-soluble protective coating coated on the multiple types of dry pellets includes a mineral source or mineral sources of boron, copper, iron, manganese, zinc, molybdenum, or a combination thereof.

20. The method of claim 16, wherein treating includes:

preventing a visibly-active fungal infection from spreading to other areas of turfgrass not affected by the fungal infection, preventing the fungal infection from infecting a continuous area of turfgrass that is uninfected, or preventing an outbreak of a visibly-active fungal infection, and wherein an average coverage density of the anti-fungal pelleted blend is about 0.005 to about 0.0125 pound per square foot.

21. The method of claim 16, wherein an average coverage density of the anti-fungal pelleted blend is about 0.005 to about 0.015 pound per square foot.

22. The method of claim 16, wherein the watering begins after the temperature drops below 70° F.

23. The method of claim 16, wherein an ambient relative humidity where treating occurs at the hottest time of day on 75% to 100% of the days ranges from about 20% to about 50% R.H., and wherein a temperature where treating occurs at the hottest time of day on 75% to 100% of the days ranges from about 85° F. to about 105° F.

24. The method of claim 16, wherein applying the anti-fungal pelleted blend occurs without use of a chemical fungicide.

25. The method of claim 16, wherein the multiple types of dry pellets provide N-P-K values where:

N is from 22 to 36,

P is from 6 to 15, and

K is from 6 to 15.

26. The method of claim 16, where the multiple types of dry pellets include:

urea source pellets;

ammonium source pellets including ammonium sulfate;

phosphorus source pellets including an ammonium phosphate compound; and potassium source pellets including potassium chloride, potassium phosphate, potassium nitrate, potassium sulfate, or a combination thereof.

27. The method of claim 16, wherein the multiple types of dry pellets include:

ammonium source pellets including ammonium sulfate; and potassium source pellets including potassium chloride.

28. An anti-fungal pelleted blend, comprising:

multiple types of dry pellets homogenously admixed together, wherein the multiple types of dry pellets collectively have N-P-K values where:

N is from 20 to 40,

P is from 4 to 20, and

K is from 5 to 20; and a water-soluble protective coating coated on the multiple types of dry pellets, the protective coating including a mineral source or mineral sources of boron, copper, iron, manganese, zinc, molybdenum, or a combination thereof, wherein the multiple types of dry pellets coated with the water-soluble protective coating have a water solubility of at least about 100 g/L and are from 90 wt % to 100 wt % dissolvable in water at 20° C. within 3 minutes.

29. The anti-fungal pelleted blend of claim 28, wherein the water solubility is at least about 200 g/L.

30. The anti-fungal pelleted blend of claim 28, wherein the water solubility is at least about 300 g/L.

31. An anti-fungal pelleted blend, comprising:

multiple types of dry pellets homogenously admixed together, wherein the multiple types of dry pellets collectively have N-P-K values where:

N is from 20 to 40,

P is from 4 to 20, and

K is from 5 to 20; and a water-soluble protective coating coated on the multiple types of dry pellets, the protective coating including a mineral source or mineral sources of boron, copper, iron, manganese, zinc, molybdenum, or a combination thereof, the water-soluble protective coating providing one or more of from 0.005 wt % to 0.05 wt % boron content, from 0.01 wt % to 0.2 wt % copper content, from 0.05 wt % to 0.3 wt % iron content, from 0.01 wt % to 0.2 wt % manganese content, from 0.01 wt % to 0.2 wt % zinc content, from 0.0001 wt % to 0.002 wt % molybdenum content, or a combination thereof based on the total weight of the anti-fungal pelleted blend, wherein the multiple types of dry pellets coated with the water-soluble protective coating are from 90 wt % to 100 wt % dissolvable in water at 20° C. within 3 minutes.

32. The anti-fungal pelleted blend of claim 31, wherein the two or more of the mineral sources of boron, copper, iron, manganese, zinc, molybdenum are included in water-soluble protective coating.

33. The anti-fungal pelleted blend of claim 31, wherein the all of the mineral sources of boron, copper, iron, manganese, zinc, molybdenum are included in water-soluble protective coating.

\* \* \* \* \*